United States Patent
Kim

(10) Patent No.: US 9,711,777 B2
(45) Date of Patent: Jul. 18, 2017

(54) RECHARGEABLE BATTERY

(71) Applicant: SAMSUNG SDI CO., LTD., Yongin-si, Gyeonggi-do (KR)

(72) Inventor: Duk-Jung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 519 days.

(21) Appl. No.: 13/923,355

(22) Filed: Jun. 20, 2013

(65) Prior Publication Data

US 2014/0242856 A1 Aug. 28, 2014

Related U.S. Application Data

(60) Provisional application No. 61/770,168, filed on Feb. 27, 2013.

(51) Int. Cl.
| | |
|---|---|
| H01M 2/24 | (2006.01) |
| H01M 6/42 | (2006.01) |
| H01M 4/02 | (2006.01) |
| H01M 4/13 | (2010.01) |
| H01M 2/20 | (2006.01) |
| H01M 2/26 | (2006.01) |
| H01M 2/34 | (2006.01) |
| H01M 10/04 | (2006.01) |
| H01M 10/42 | (2006.01) |

(Continued)

(52) U.S. Cl.
CPC ............ *H01M 2/206* (2013.01); *B63H 21/17* (2013.01); *H01M 2/26* (2013.01); *H01M 2/34* (2013.01); *H01M 10/0413* (2013.01); *H01M 10/0436* (2013.01); *H01M 10/4235* (2013.01); *H01M 2/1653* (2013.01); *H01M 2/305* (2013.01); *H01M 10/0525* (2013.01); *H01M 2200/00* (2013.01); *Y02T 10/7011* (2013.01)

(58) Field of Classification Search
CPC ............ H01M 6/42; H01M 4/13; H01M 2/24; H01M 2/26
USPC .................................. 429/156, 211
See application file for complete search history.

(56) References Cited

U.S. PATENT DOCUMENTS 6,040,086 A * 3/2000 Yoshida et al. ............... 429/211
6,168,879 B1 1/2001 Kim
(Continued)

FOREIGN PATENT DOCUMENTS

| CN | 1235382 A | 11/1999 |
|---|---|---|
| CN | 1261728 A | 8/2000 |

(Continued)

OTHER PUBLICATIONS

Abstract of KR 10-2006-0092445 which corresponds to KR 10-0875607.

(Continued)

*Primary Examiner* — Patrick Ryan
*Assistant Examiner* — Julian Anthony
(74) *Attorney, Agent, or Firm* — Lewis Roca Rothgerber Christie LLP

(57) ABSTRACT

A rechargeable battery includes a plurality of electrode assemblies including a first electrode assembly and a second electrode assembly; a case housing the plurality of electrode assemblies; a first conductive plate between the first electrode assembly and the case; and a first contact electrically coupling the first conductive plate to the second electrode assembly.

22 Claims, 9 Drawing Sheets

(51) Int. Cl.
*B63H 21/17* (2006.01)
*H01M 2/16* (2006.01)
*H01M 2/30* (2006.01)
*H01M 10/0525* (2010.01)

(56) References Cited

U.S. PATENT DOCUMENTS

| | | | |
|---|---|---|---|
| 7,378,187 B2 | 5/2008 | Kim | |
| 8,034,482 B2* | 10/2011 | Tasai | H01M 2/266 429/158 |
| 8,968,908 B2 | 3/2015 | Kim et al. | |
| 2011/0136004 A1 | 6/2011 | Kwak et al. | |
| 2012/0052341 A1* | 3/2012 | Kim et al. | 429/53 |
| 2012/0196166 A1* | 8/2012 | Kim | 429/94 |
| 2013/0193927 A1 | 8/2013 | Schaefer | |

FOREIGN PATENT DOCUMENTS

| | | |
|---|---|---|
| CN | 1612373 A | 5/2005 |
| CN | 102347467 A | 2/2012 |
| EP | 2 410 594 A1 | 1/2012 |
| KR | 10-2008-0057405 | 6/2008 |
| KR | 10-0875607 | 12/2008 |
| WO | WO 2013/107612 A1 | 7/2013 |

OTHER PUBLICATIONS

EPO Search Report dated Mar. 29, 2016, for corresponding European Patent application 13173498.0, (8 pages).
EPO Office Action dated Nov. 24, 2016, for corresponding European Patent Application No. 13173498.0 (6 pages).
SIPO Office Action dated Feb. 3, 2017, for corresponding Chinese Patent Application No. 201310655378.0 (17 pages).

* cited by examiner

RECHARGEABLE BATTERY

CROSS-REFERENCE TO RELATED APPLICATION

This application claims priority to and the benefit of U.S. Provisional Application No. 61/770,168, filed on Feb. 27, 2013 in the U.S. Patent and Trademark Office, the entire content of which is incorporated herein by reference.

BACKGROUND (a) Field

The present invention relates to a rechargeable battery.

(b) Description of the Related Art

A rechargeable battery may be repeatedly charged and discharged unlike a primary battery that is not designed to be recharged. A rechargeable battery having a low capacity may be used for a small portable electronic device such as a mobile phone, a laptop computer, and/or a camcorder, and a large capacity battery is widely used as a power source for driving a motor of a hybrid vehicle, etc.

Nowadays, a high power rechargeable battery using a non-aqueous electrolyte of a high energy density has been developed, and the high power rechargeable battery is formed as a large capacity rechargeable battery by coupling in series a plurality of rechargeable batteries to use for driving a motor of a device, for example, an electric vehicle requiring a large amount of electric power. Such a rechargeable battery may be formed in a cylindrical shape or a square shape.

When a conductive foreign material such as a nail, an awl, and the like invades (or punctures) into the rechargeable battery from the outside, an internal short-circuit may occur in the rechargeable battery. When the short-circuit occurs, a temperature in the rechargeable battery may rapidly increase, thereby possibly causing fire or an explosion of the rechargeable battery.

The above information disclosed in this Background section is only for enhancement of understanding of the background of the invention and therefore it may contain information that does not form the prior art that is already known in this country to a person of ordinary skill in the art.

SUMMARY

Embodiments of the present invention have been made in an effort to provide a rechargeable battery having improved safety.

A rechargeable battery according to one aspect of the present invention includes a plurality of electrode assemblies including a first electrode assembly and a second electrode assembly; a case housing the plurality of electrode assemblies; a first conductive plate between the first electrode assembly and the case; and a first contact electrically coupling the first conductive plate to the second electrode assembly.

The second electrode assembly may be farther from the first conductive plate than the first electrode assembly.

The first conductive plate may not be electrically coupled to the first electrode assembly.

The rechargeable battery may further include a second conductive plate between the second electrode assembly and the case; and a second contact electrically coupling the second conductive plate to the first electrode assembly.

The first electrode assembly may be farther from the second conductive plate than the second electrode assembly.

The second conductive plate may not be electrically coupled to the second electrode assembly.

The rechargeable battery may further include a cap plate covering an opening of the case, wherein the second contact is electrically coupled to the second conductive plate at a location near the cap plate.

The first contact may be electrically coupled to a negative electrode of the second electrode assembly.

The rechargeable battery may further include a current collecting tab coupled to the negative electrode, wherein the negative electrode electrically couples the first contact to the current collecting tab.

The rechargeable battery may further include a fixing member penetrating the first contact, the negative electrode, and the current collecting tab.

The fixing member may include a rivet.

The rechargeable battery may further include a current collecting tab electrically coupling the first contact to the negative electrode.

The first contact and the current collecting tab may be welded together.

The first conductive plate and the first contact may each include metal.

The rechargeable battery may further include an insulation film between the first conductive plate and the first electrode assembly.

The insulation film may include a polymer material.

The first conductive plate and the first contact may be integrally formed.

The rechargeable battery may further include a cap plate on an opening of the case, wherein the first contact is coupled to the first conductive plate at a location far from the cap plate.

The rechargeable battery may further include an insulation layer coupled to a portion of the first contact.

The plurality of electrode assemblies may further include a third electrode assembly adjacent the second electrode assembly and electrically coupled to the first conductive plate.

The plurality of electrode assemblies may further include at least a third electrode assembly and a fourth electrode assembly, wherein the third electrode assembly is between the second electrode assembly and the fourth electrode assembly, and wherein the third electrode assembly is electrically coupled to the first conductive plate and the fourth electrode assembly is electrically coupled to the second conductive plate.

According to an exemplary embodiment of the present invention, fire or an explosion due to an internal short-circuit caused by an invasion (or puncturing) of a conductive foreign material may be prevented, thereby improving the safety of the rechargeable battery.

DETAILED DESCRIPTION OF THE EMBODIMENTS

Figure 1:
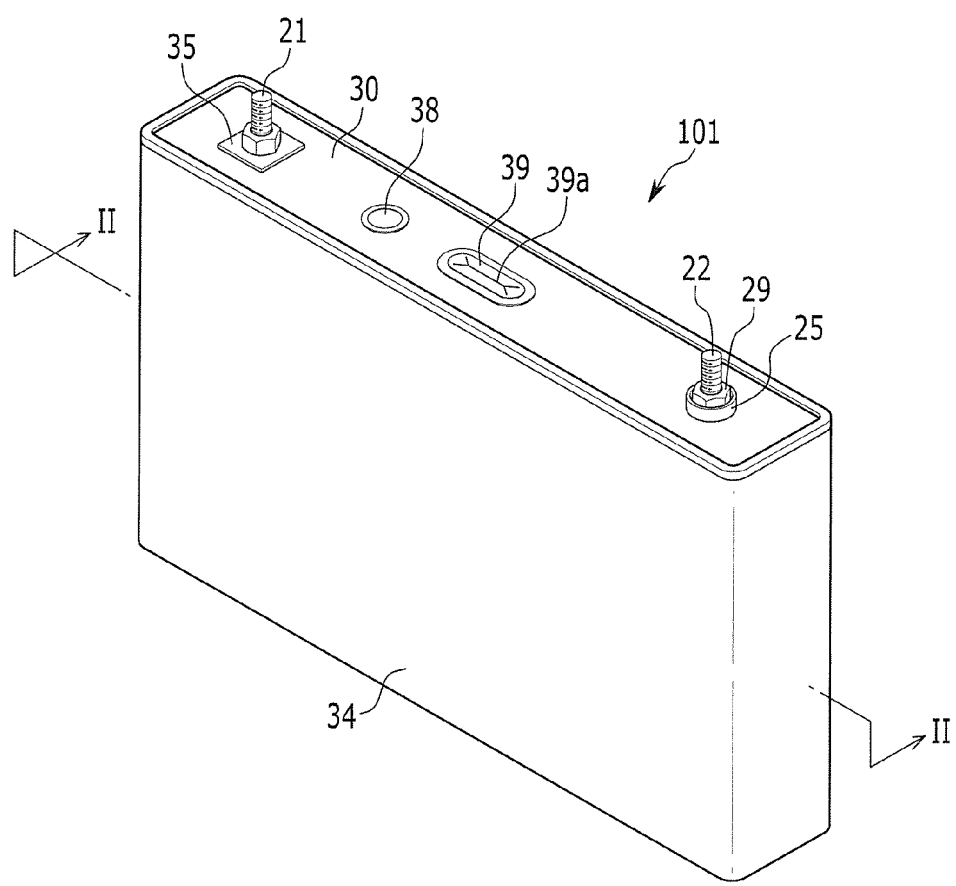
FIG. 1 is a perspective view of a rechargeable battery according to a first exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Like reference numerals designate like elements throughout the specification.

Figure 2:
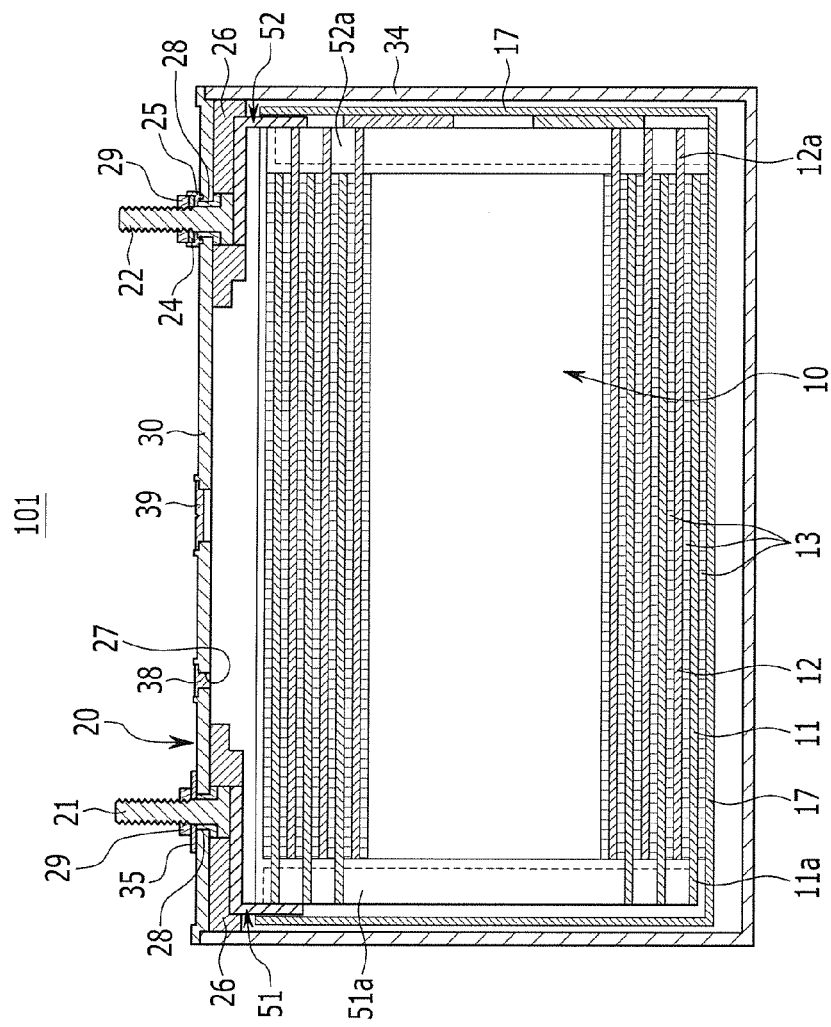
FIG. 2 is a cross-sectional view of FIG. 1, taken along the line II-II.

FIG. 1 is a perspective view of a rechargeable battery according to a first exemplary embodiment of the present invention, and FIG. 2 is a cross-sectional view of FIG. 1, taken along the line II-II.

Referring to FIG. 1 and FIG. 2, a rechargeable battery 101 according to the first exemplary embodiment includes a plurality of electrode assemblies 10, each formed by spirally winding a positive electrode 11 and a negative electrode 12 with a separator 13 interposed therebetween, a case 34 housing (or having installed) the electrode assemblies 10 therein, and a cap assembly coupled to an opening of the case 34.

The rechargeable battery 101 according to the first exemplary embodiment is exemplarily illustrated as a lithium ion rechargeable battery formed in the shape of a prism. However, the present invention is not limited thereto, and the present invention may be applied to a lithium polymer battery, a cylindrical battery, or the like.

The positive electrode 11 includes a positive coated region that is an area where an active material is coated to a current collector that is formed of a thin film metal foil that is made of aluminum and/or the like. The positive electrode 11 also includes a positive uncoated region 11a that is an area not coated with the active material. The negative electrode 12 includes a negative coated region that is an area where an active material is coated to a current collector that is formed of a thin film metal foil that is made of copper and/or the like. The negative electrode 12 also includes a negative uncoated region 12a that is an area not coated with the active material.

Figure 4:
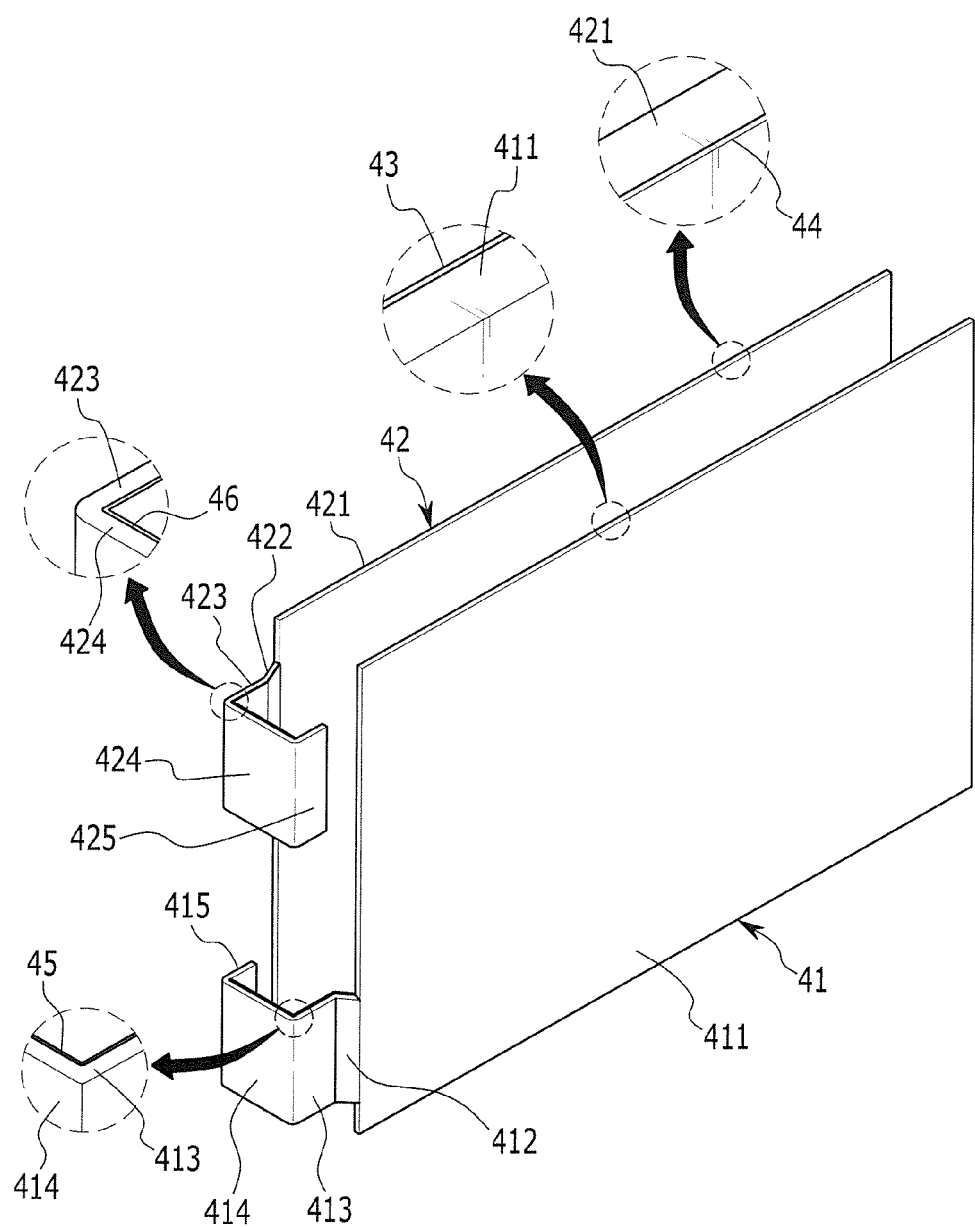
FIG. 4 is a perspective view of a first safety member and a second safety member according to the first exemplary embodiment of the present invention.

According to the embodiment depicted in FIGS. 1 and 2, the positive electrode 11 is a second electrode coupled (e.g., connected) with the case 34, and the negative electrode 12 is a first electrode coupled with safety members 41 and 42 (shown in FIG. 4). However, the present invention is not limited thereto, and thus the positive electrode 11 may be the first electrode and the negative electrode 12 may be the second electrode. In addition, in the present exemplary embodiment, two electrode assemblies 10 are installed in the case 34, but the present invention is not limited thereto. Thus, a plurality of electrode assemblies (e.g., 3 or more electrode assemblies) may be installed in the case.

The positive uncoated region 11a is formed at one side end of the positive electrode 11 along a length direction of the positive electrode 11, and the negative uncoated region 12a is formed at the other side end of the negative electrode 12 along a length direction of the negative electrode 12. In addition, the positive electrode 11 and the negative electrode 12 are spirally wound after disposing (e.g., interposing or positioning) a separator 13, which is an insulator, therebetween.

However, the present invention is not limited thereto, and the electrode assembly 10 may have a structure in which a plurality of first electrodes 11 and a plurality of second electrodes 12 respectively formed of sheets are alternately layered, with the separator 13 interposed therebetween.

The case 34 has an approximately cuboid shape, and is provided with an opening that is opened to one face thereof. An insulating encapsulation 17 for insulation is installed between the case 34 and the electrode assemblies 10. The insulating encapsulation 17 has a film shape and the top of the insulating encapsulation 17 is opened.

The cap assembly 20 includes a cap plate 30 covering the opening of the case 34, a positive terminal 21 which protrudes outwardly from the cap plate 30 and is electrically coupled with the positive electrode 11, a negative terminal 22 which protrudes outwardly from the cap plate and is electrically coupled with the negative electrode, and a vent member 39 with a notch 39a which may fracture depending on set internal pressure.

The cap plate 30 may be formed by a thin sheet and an electrolyte injection hole 27 for injecting an electrolyte formed at one side. A sealing plug 38 is installed at the electrolyte injection hole 27.

A lower gasket 25 is installed between the cap plate 30 and the terminals 21 and 22 to seal the space between the cap plate 30 and the terminals 21 and 22. In the described embodiment, the terminals 21 and 22 include the positive terminal 21 and the negative terminal 22.

The lower gasket 28 fits in a terminal hole and is closely disposed (or located) on the bottom of the cap plate 30. The terminals 21 and 22 have a cylindrical shape. Nuts 29 supporting the terminals 21 and 22 on the top are installed at the terminals 21 and 22 and threads are formed on the outer peripheries of the terminals so that the nuts 29 are fastened to the outer peripheries of the terminals 21 and 22.

A connection plate 35 is inserted into the positive terminal 21. Therefore, the connection plate 35 is installed between the nut 29 and the cap plate 30. The connection plate 35 serves to electrically connect the positive terminal 21 and the cap plate 30 to each other. Accordingly, the cap plate 30 and the case 34 are electrically coupled with the positive electrode 11.

An upper gasket 25 is installed into the negative terminal 22. Therefore, the upper gasket 25 is disposed (or located) on the lower gasket 28 to contact the top of the cap plate 30. The upper gasket 25 serves to insulate the negative terminal 22 and the cap plate 30 from each other. A washer 24 buffering the fastening force between the nut 29 and the upper gasket 25 is installed on the upper gasket 25. A lower insulation member 26 that insulates the cap plate 30 and the terminals 21 and 22 is provided at or near a lower portion of each of the terminals 21 and 22.

A current collecting member 51 electrically coupled with the positive electrode 11 may be attached to the positive terminal 21 by welding, and the positive terminal 21 and the current collecting member 51 are inserted into grooves formed at the bottom side of the lower insulation member 26. The current collecting member is provided with a plurality of tabs 51a protruding downward, and the plurality of tabs 51a may be attached to the respective positive uncoated regions 11a by welding.

A current collecting member 52 electrically coupled with the negative terminal 22 may be attached to the negative electrode 12 by welding, and the negative terminal 22 and the current collecting member 52 are fitted into grooves formed at the bottom side of the lower insulation member 26. The current collecting member 52 is provided with a plurality of tabs protruding downward and the plurality of tabs may be attached to the respective negative uncoated regions 12a by welding.

Safety members electrically coupled to the negative electrode 12 are installed at external sides of the electrode assemblies 10.

Figure 3:
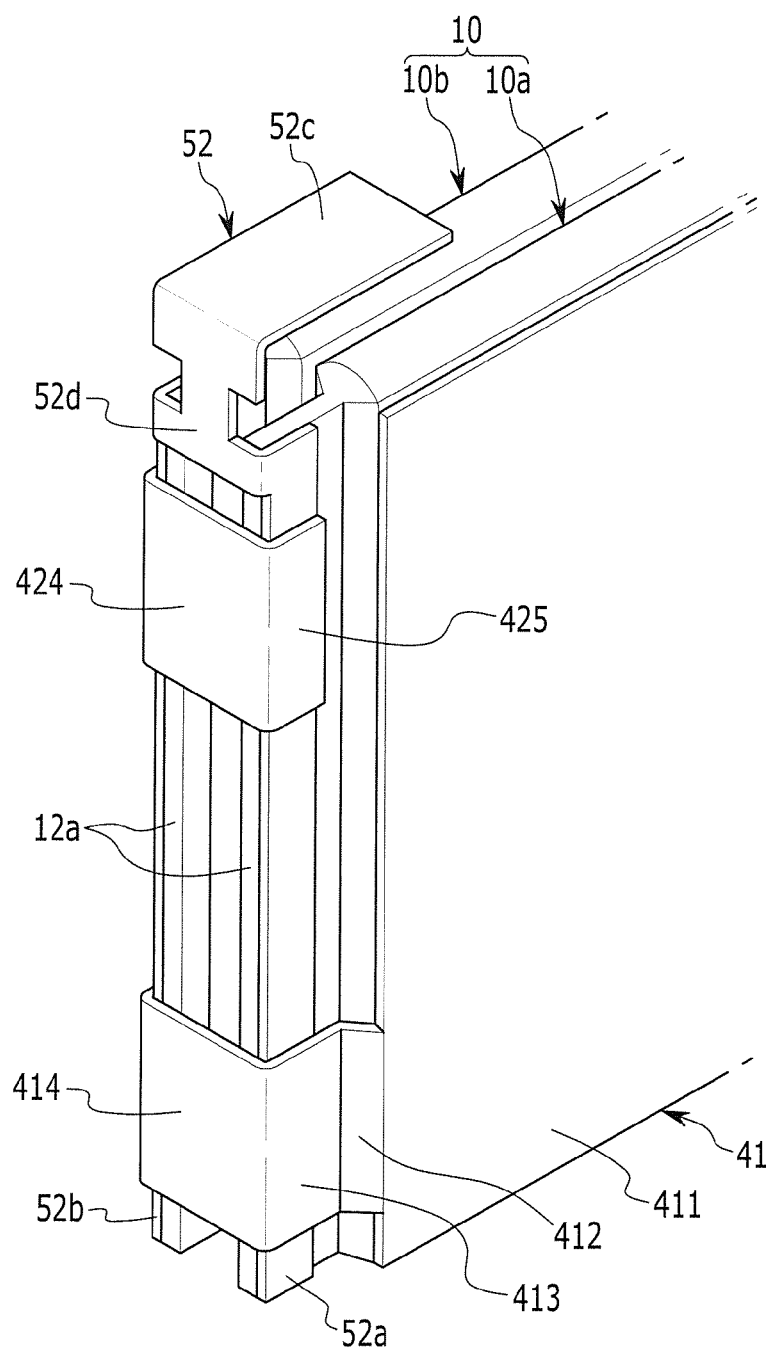
FIG. 3 is a partial perspective view of an electrode assembly, a safety member, and a current collecting member according to the first exemplary embodiment of the present invention.

FIG. 3 is a partial perspective view of the electrode assembly, the safety member, and the current collecting member according to the first exemplary embodiment of the present invention, and FIG. 4 is a perspective view of a first safety member and a second safety member.

Referring to FIG. 3 and FIG. 4, the safety member includes a first safety member 41 disposed (or located) at a first external side of each of the electrode assemblies 10 arranged in a layered manner and a second safety member 42 disposed (or located) at a second external side of each of the electrode assemblies 10.

In addition, each electrode assembly 10 includes a first electrode assembly 10a disposed (or located) to face a first inner side of the case 34 at a flat surface thereof and a second electrode assembly 10b disposed (or located) to face a second inner side of the case 34 at a flat surface thereof. Here, the first inner side of the case 34 and the flat surface of the first electrode assembly 10a are disposed (or located) adjacent to each other, and the second inner side of the case 34 and the flat surface of the second electrode assembly 10b are disposed (or located) adjacent to each other. The first safety member 41 is disposed (or located) between the first inner side of the case 34 and the first electrode assembly 10a, and the second safety member is disposed (or located) between the second inner side of the case 34 and the second electrode assembly 10b.

The current collecting member 52 coupled to the negative electrode 12 includes an upper plate 52c coupled with a terminal, a connection plate 52d bent downward from the upper plate 52c, and a plurality of tabs bent in parallel with the negative uncoated regions 12a and extending from the connection plate 52d. The current collecting member 52 according to the present exemplary embodiment includes two tabs that are respectively coupled with two electrode assemblies 10. The two tabs include a first tab 52a attached to the first electrode assembly 10a and a second tab 52b attached to the second electrode assembly 10b.

The first safety member 41 is disposed (or located) to contact the external surface of the first electrode assembly 10a. The first safety member 41 includes a side plate 411 attached to a flat surface that faces the outside away from the first electrode assembly 10a and a connection protrusion coupled to the side plate 411 and coupled (or fixed) to the second tab 52b. In the present exemplary embodiment, flat surface implies a plane side, excluding upper and lower bent portions in the external peripheral surface.

The side plate 411 and the connection protrusion may be made of metal plates having conductivity, such as copper, stainless steel, and/or the like. An insulation film 43 is attached to a side of the side plate 411, contacting the first electrode assembly 10a. The insulation film 43 may be made of a polymer material, and prevents direct contact between the side plate 411 and the first electrode assembly 10a.

In addition, the connection protrusion includes a connection portion 415 coupled (or fixed) to the negative uncoated region 12a, an inclined portion 412 bent with a slope extending from the side plate 411, an extension portion 413 extending toward a side end of the first electrode assembly 10a, and a support portion 414 bent from the extension portion 413 and extending toward the connection portion 415.

Here, the connection portion 415 is coupled to the side plate through the inclined portion 412, the extension portion 413, and the support portion 414. In the present exemplary embodiment, the side plate 411 and the connection protrusion are integrally formed, and the connection protrusion is coupled with a first lower side end of the side plate 411.

The inclined portion 412 supports the negative uncoated region 12a to prevent the negative uncoated region 12a from moving due to an external impact or vibration, and the support portion 414 extends from a side end of the first electrode assembly 10a to a side end of the second electrode assembly 10b to couple the extension portion 413 and the connection portion 415 to each other. An insulation film 45 is provided at or adjacent the inclined portion 412, the extension portion 413, and the support portion 414 to insulate corresponding portions of the connection protrusion from the first electrode assembly 10a and the first tab 52a. However, the insulation film 45 is not provided in the connection portion 415.

The connection portion 415 directly contacts the second tab 52b and may be welded thereto so as to be electrically coupled to the negative uncoated region 12a of the second electrode assembly 10b. In the present exemplary embodiment, the connection portion 415 is welded to the second tab 52b, but the present invention is not limited thereto, and thus the connection portion 415 may be directly attached to the negative uncoated region 12a of the second electrode assembly 10b.

Accordingly, the first safety member 41 is further closely (or proximately) attached to the first electrode assembly 10a than to the second electrode assembly 10b, but has an electrical connection with the second electrode assembly 10b.

The second safety member 42 contacts the external surface of the second electrode assembly 10b. The second safety member 42 includes a side plate 421 attached to a flat surface of the second electrode assembly 10b, facing outside, and a connection protrusion coupled to the side plate 421 and electrically coupled with the negative uncoated region 12a of the first electrode assembly 10a.

The side plate 421 and the connection protrusion may be made of a metal plate having conductivity, such as copper, stainless steel, and/or the like. An insulation film 44 is attached to a side of the side plate 421, contacting the second electrode assembly 10b. The insulation film 44 may be made of a polymer material, and prevents the side plate 421 from directly contacting the second electrode assembly 10b.

The connection protrusion includes a connection portion 425 fixed to the negative uncoated region 12a, an inclined portion 422 bent with a slope extending from the side plate 421, an extension portion 423 extended toward a side end of the second electrode assembly 10b, and a support portion 424 bent from the extension portion 423 and extended toward the connection portion 425.

Here, the connection portion 425 is coupled to the side plate through the inclined portion 422, the extension portion 423, and the support portion 424. In the present exemplary embodiment, the side plate 421 and the connection protrusion are integrally formed, and the connection protrusion is coupled with one upper end side of the side plate 421.

The inclined portion 422 supports the negative uncoated region 12*a* to prevent the negative uncoated region 12*a* from moving due to an external impact or vibration, and the support portion 424 extends to a side end of the first electrode assembly 10*a* from a side end of the second electrode assembly 10*b* to couple the extension portion 423 and the connection portion 425 to each other. An insulation film 46 is provided in the inclined portion 422, the extension portion 423, and the support portion 424 for insulation from the second electrode assembly 10*b* and the second tab 52*b*. However, the insulation film 46 is not provided in the connection portion 425.

The connection portion 425 may be welded to the first tab 52*a* and thus be electrically coupled to the negative uncoated region 12*a* of the first electrode assembly 10*a*. Accordingly, although being closely (or proximately) attached to the second electrode assembly 10*b*, the second safety member 42 is electrically coupled to the first electrode assembly 10*a*.

Figure 5:
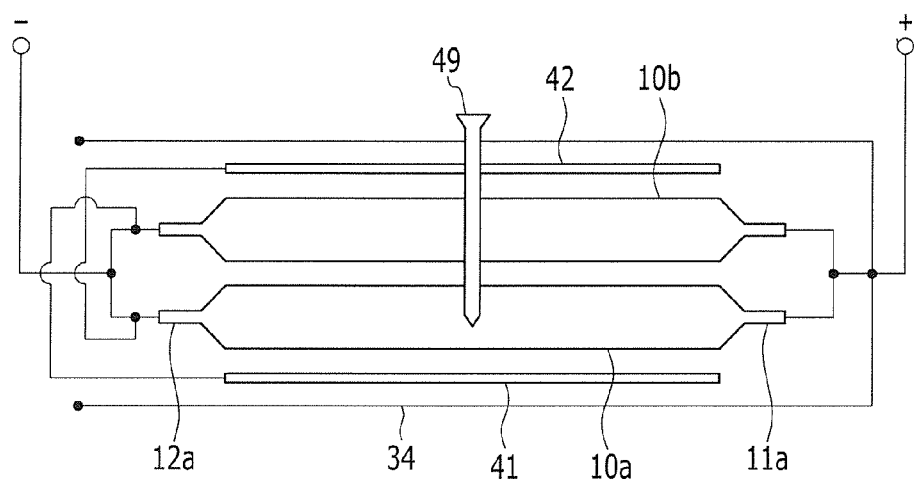
FIG. 5 is a schematic diagram of a state in which a foreign material has invaded into a rechargeable battery according to the first exemplary embodiment of the present invention.

FIG. 5 is a schematic diagram of a state that a foreign material has invaded into a rechargeable battery according to the first exemplary embodiment of the present invention.

As shown in FIG. 5, a conductive foreign material 49, such as a nail, penetrates into a portion where the second electrode assembly 10*b* is located, through the case 34, the case 34 and the second safety member 42 are short-circuited and thus the negative electrode 12 of the first electrode assembly 10*a* and the case 34 conduct so that the first electrode assembly 10*a* is first discharged. In addition, as the conductive foreign material 49 is invaded (e.g., penetrates), an internal short-circuit occurs in the second electrode assembly 10*b* and thus the second electrode assembly 10*b* is discharged. When the invasion of the conductive foreign material 49 reaches the first electrode assembly 10*a*, an internal short-circuit occurs in the first electrode assembly 10*a* and thus a residual current in the first electrode assembly 10*a* is discharged.

As described, according to the present exemplary embodiment, an electrode assembly disposed (or located) at the opposite side of a portion where the conductive foreign material 49 is invaded (e.g., penetrates) may be first discharged.

When a plurality of electrode assemblies 10 are installed in the case 34, an electrode assembly disposed (or located) at the opposite side of the portion where the conductive foreign material 49 penetrates may catch fire. This is because the amount of current flowing through the conductive foreign material 49 gradually increases as the conductive foreign material further invades (e.g., penetrates) the battery. In addition, resistance generated from contact between the conductive foreign material 49 and a negative active material is very high, thereby causing a large amount of heat.

Furthermore, when the safety member is electrically coupled with a negative electrode of a neighboring electrode assembly, discharging of the electrode assembly disposed (or located) in a portion where the conductive foreign material invades (e.g., penetrates) the battery may be promptly induced, but a current in an electrode assembly disposed (or located) far from the invasion (e.g., penetration) cannot be discharged, thereby causing a fire.

However, according to the present exemplary embodiment, an electrode assembly disposed (or located) far from the portion where the invasion of the conductive foreign material occurs is first discharged, thereby increasing safety.

Figure 6:
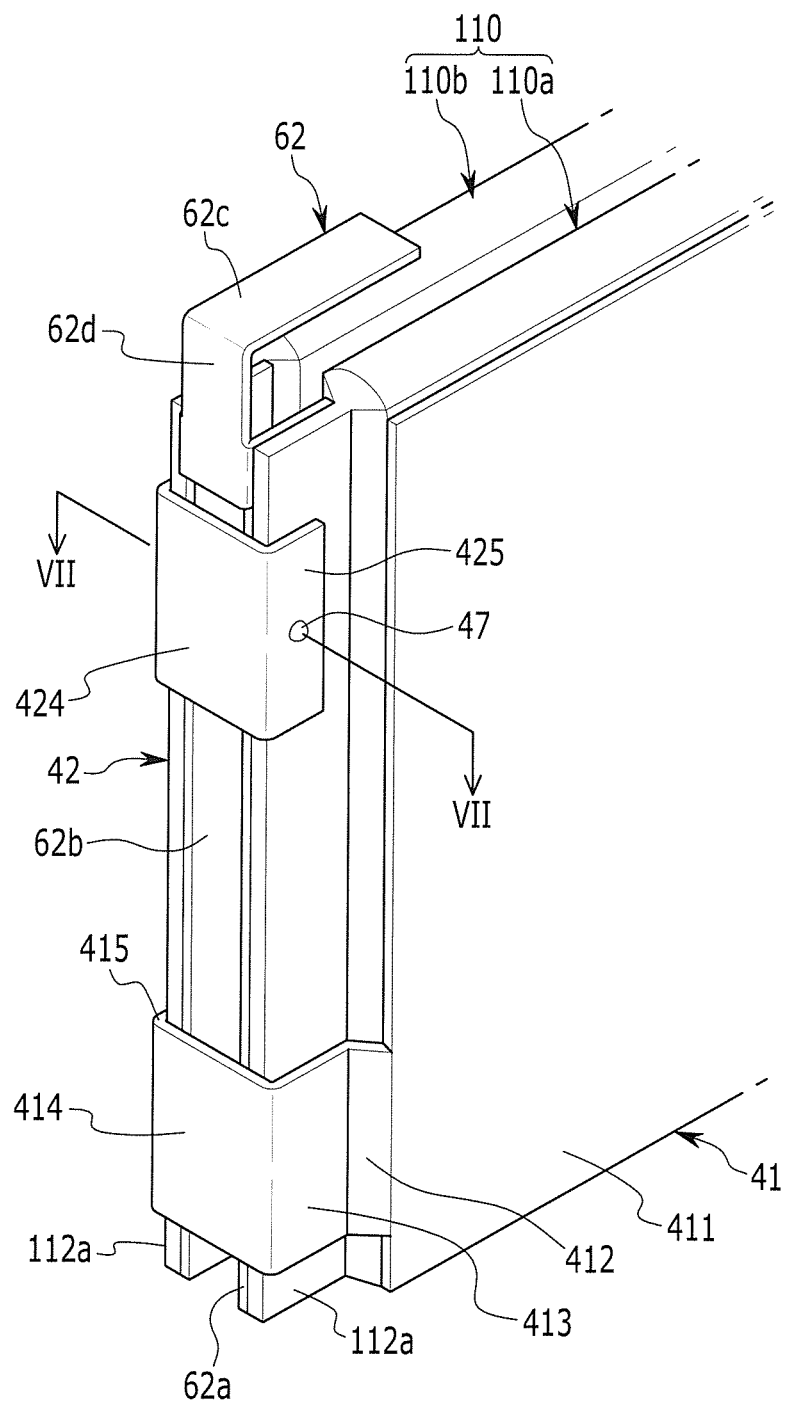
FIG. 6 is a partial perspective view of an electrode assembly, a safety member, and a current collecting member according to a second exemplary embodiment of the present invention.
Figure 7:
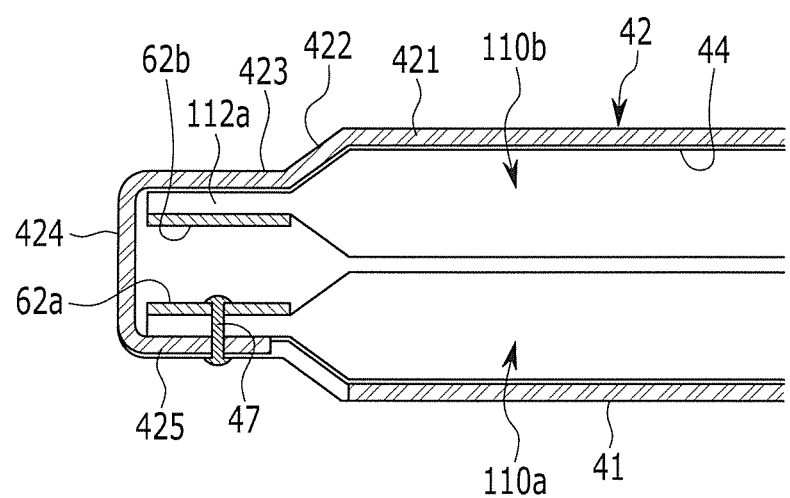
FIG. 7 is a cross-sectional view of FIG. 6, taken along the line VII-VII.

FIG. 6 is a partial perspective view of an electrode assembly, a safety member, and a current collecting member according to a second exemplary embodiment of the present invention, and FIG. 7 is a cross-sectional view of FIG. 6, taken along the line VII-VII.

Referring to FIG. 6 and FIG. 7, a rechargeable battery according to the present exemplary embodiment is the same as the rechargeable battery according to the first exemplary embodiment, except for a coupling structure between a safety member and a negative uncoated region 12*a*, and therefore a redundant description for the same structure may be omitted.

The rechargeable battery according to the present exemplary embodiment includes two electrode assemblies 110, and a current collecting member is coupled to a positive uncoated region of each of the electrode assemblies 110 and a current collecting member 62 is coupled to a negative uncoated region 112*a* of each of the electrode assemblies 110. The current collecting member provided in the positive uncoated region and the current collecting member provided in the negative uncoated region 112*a* may have the same structure.

The current collecting member 62 includes an upper plate 62*c* coupled with a negative terminal, a connection plate 62*d* bent downward from the upper plate 62*c*, and a plurality of tabs bent in parallel with the negative uncoated region 112*a* extending from the connection plate 62*d*. The current collecting member 62 includes two tabs for respectively coupling with the two electrode assemblies 110. The tabs include a first tab 62*a* attached to the first electrode assembly 110*a* and a second tab 62*b* attached to the second electrode assembly 110*b*. Here, the first tab 62*a* and the second tab 62*b* are disposed (or located) to face each other between the negative uncoated regions 112*a*.

The first safety member 41 is disposed (or located) to contact an external surface of the first electrode assembly 110*a*. The first safety member 41 includes a side plate 411 attached to a flat surface that faces the outside in the first electrode assembly 110*a* and a connection protrusion formed at the side plate 411 and coupled with the negative uncoated region 112*a* of the second electrode assembly 110*b*.

In addition, the connection protrusion includes a connection portion 415 coupled (e.g., fixed) to the negative uncoated region 112*a*, an inclined portion 412 bent with a slope extending from the side plate 411, an extension portion 413 attached to the inclined portion 412 and then extended to a side end of the first electrode assembly 110*a*, and a support portion 414 attached to the extension portion 413 and then extended toward the connection portion 415. Here, the connection portion 415 is coupled to the side plate 411 through the inclined portion 412, the extension portion 413, and the support portion 414.

The connection portion 415 is attached (e.g., fixed) to the negative uncoated region 112*a* of the second electrode assembly 110*b*, and therefore the negative uncoated region 112*a* is disposed (or located) between the connection portion 415 and the second tab 62*b*. The connection portion 415 is attached (e.g., fixed) to the negative uncoated region 112*a* by a fixing member 47 that penetrates the negative uncoated region 112*a* and the connection portion 415. In the present exemplary embodiment, the fixing member 47 is formed of a rivet, and the rivet fixes (e.g., integrally fixes) the connection portion 415, the negative uncoated region 112*a*, and the second tab 62b by penetrating the connection portion 415, the negative uncoated region 112a, and the second tab 62b.

As in the present exemplary embodiment, when the fixing member 47 is fixed (e.g., integrally fixed) to the connection portion 415, the negative uncoated region 112a, and the second tab 62b by penetrating them, a contact failure due to an external vibration or impact can be prevented (or a possibility of such contact failure can be reduced).

The second safety member 42 contacts the external surface of the second electrode assembly 110b. The second safety member 42 includes a side plate 421 attached to a flat surface that faces toward the outside opposite from the second electrode assembly 110b and a connection protrusion coupled to the side plate 421 and thus coupled to the negative uncoated region 112a of the first electrode assembly 110a.

In addition, the connection protrusion includes a connection portion 425 fixed to the negative uncoated region 112a, an inclined portion 422 bent with a slope from the side plate 421, an extension portion 423 attached to the inclined portion 422 and extended toward a side end of the second electrode assembly 110b, and a support portion 424 attached to the extension portion 423 and then extended toward the connection portion 425. Here, the connection portion 425 is coupled to the side plate 421 through the inclined portion 422, the extension portion 423, and the support portion 424.

The connection portion 425 is fixed (e.g., coupled) to the negative uncoated region 112a of the first electrode assembly 110a, and therefore the negative uncoated region 112a is disposed (or located) between the connection portion 425 and the first tab 62a. The connection portion 425 is fixed to the negative uncoated region 112a by the fixing member 47 penetrating the negative uncoated region 112a and the connection portion 425. In the present exemplary embodiment, the fixing member 47 is formed of a rivet, and the rivet fixes (e.g., integrally fixes) the connection portion 425, the negative uncoated region 112a, and the first tab 62a by penetrating these components.

Figure 8:
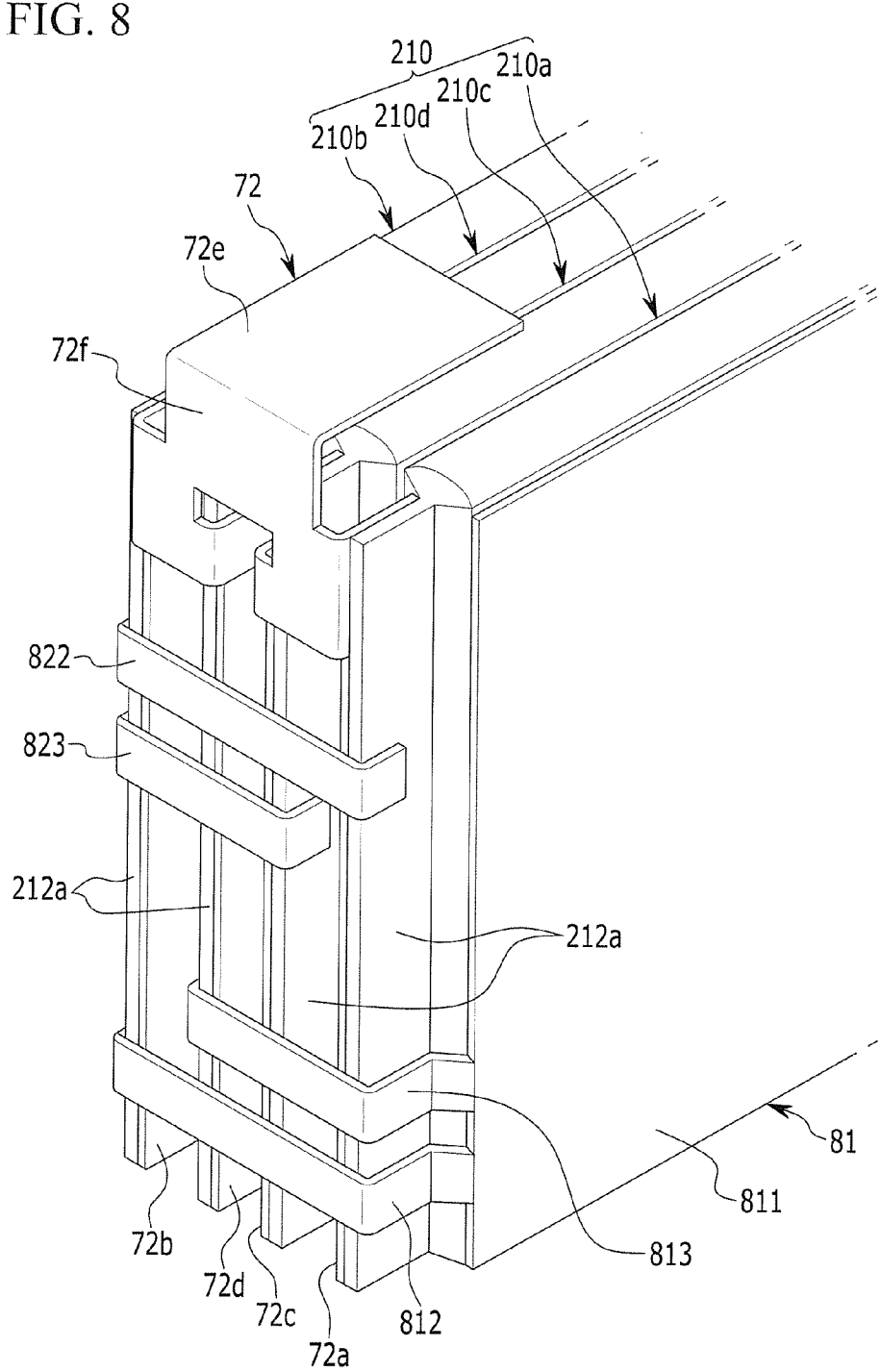
FIG. 8 is a partial perspective view of an electrode assembly, a safety member, and a current collecting member according to a third exemplary embodiment of the present invention.
Figure 9:
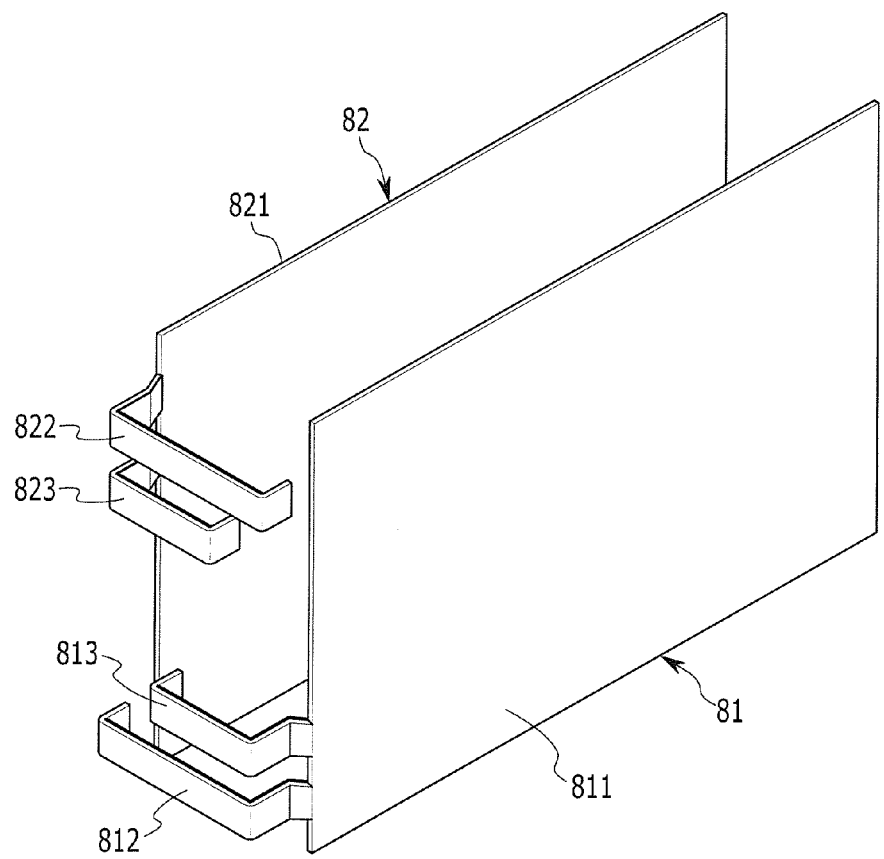
FIG. 9 is a perspective view of a first safety member and a second safety member according to the third exemplary embodiment of the present invention.

FIG. 8 is a partial perspective view of an electrode assembly, a safety member, and a current collecting member according to a third exemplary embodiment of the present invention, and FIG. 9 is a perspective view of a first safety member and a second safety member according to the third exemplary embodiment of the present invention.

Referring to FIG. 8 and FIG. 9, a rechargeable battery according to the present exemplary embodiment is substantially the same as the rechargeable battery of the first exemplary embodiment, excluding the number of electrode assemblies and structures of a safety member and a current collecting member, and therefore a redundant description for the same structure may be omitted.

The rechargeable battery according to the present exemplary embodiment includes four electrode assemblies 210, and the four electrode assemblies 210 are layered in parallel with each other. A first electrode assembly 210a is disposed (or located) at one side end of the electrode assemblies 210, and a second electrode assembly 210b is disposed (or located) at the other side end of the electrode assemblies 210. A third electrode assembly 210c is disposed (or located) adjacent to the first electrode assembly 210a between the first electrode assembly 210a and the second electrode assembly 210b, and the fourth electrode assembly 210d is disposed (or located) between the second electrode assembly 210b and the third electrode assembly 210c. Accordingly, the first electrode assembly 210a, the third electrode assembly 210c, the fourth electrode assembly 210d, and the second electrode assembly 210b are sequentially disposed (or located).

A current collecting member may be coupled to a positive uncoated region of each electrode assembly 210 and a current collecting member 72 is coupled to a negative uncoated region 212a of each electrode assembly 210. The current collecting member provided in the positive uncoated region and the current collecting member 72 provided in the negative uncoated region 212a may have the same structure.

The current collecting member 72 includes an upper plate 72e coupled with a negative terminal, a connection plate 72f bent downward from the upper plate 72e, and a plurality of tabs bent in parallel with the negative uncoated region 212a extending from the connection plate 72f. The current collecting member 72 includes four tabs so as to be respectively coupled to the four electrode assemblies 210. The tabs include a first tab 72a attached to the first electrode assembly 210a, a second tab 72b attached to the second electrode assembly 210b, a third tab 72c attached to the third electrode assembly 210c, and a fourth tab 72d attached to the fourth electrode assembly 210d. The tabs may be welded to the negative uncoated regions 212a while in a state of being disposed (or located) in parallel with the negative uncoated regions 212a.

Because the first safety member 81 is attached to the external side of the first electrode assembly 210a, the first safety member 81 includes a side plate 811 attached to a flat surface that faces the outside opposite from the first electrode assembly 210a and connection protrusions 812 and 813 coupled to the side plate 811 and then attached to the negative uncoated regions 212a of the second and fourth electrode assemblies 210b and 210d, respectively. Here, an insulation film is provided in the side plate 811.

The first safety member 81 includes two connection protrusions 812 and 813, and therefore one of the two connection protrusions 812 and 813 is joined to the negative uncoated region 212a of the second electrode assembly 210b and the other is joined to the negative uncoated region 212a of the fourth electrode assembly 210d. Accordingly, the first safety assembly 81 is electrically coupled with the second electrode assembly 210b and the fourth electrode assembly 210d that are disposed (or located) at the opposite side.

The second safety member 82 is provided at the external side of the second electrode assembly 210b, and therefore the second safety member 82 includes a side plate 821 attached to a flat surface that faces the outside opposite from the second electrode assembly 210b and connection protrusions 822 and 823 coupled to the side plate 821 and attached to the negative uncoated regions 212a of the first and third electrode assemblies 210a and 210c. Here, an insulation film is provided at or adjacent the side plate 821.

The second safety member 82 includes two connection protrusions 822 and 823, and therefore one of the two connection protrusions 822 and 823 is joined to the negative uncoated region 212a of the first electrode assembly 210a and the other is coupled to the negative uncoated region 212a of the third electrode assembly 210c. Accordingly, the second safety member 82 is electrically coupled with the first electrode assembly 210a and the third electrode assembly 210c that are disposed (or located) at the opposite side.

As described, according to the present exemplary embodiment, two electrode assemblies are electrically coupled to one safety member, and therefore a current in the two electrode assemblies can be discharged when a conductive foreign material invades (e.g., penetrates) the battery and thus contacts the safety member. In addition, a current in electrode assemblies disposed (or located) at the opposite side of the portion where the conductive foreign material invades (e.g., penetrates) also can be discharged, thereby improving safety.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

DESCRIPTION OF SOME OF THE SYMBOLS

101: rechargeable battery
10, 110, 210: electrode assembly
10a, 110a, 210a: first electrode assembly
10b, 110b, 210b: second electrode assembly
11: positive electrode
12: negative electrode
20: cap assembly
21: positive terminal
210c: third electrode assembly
210d: fourth electrode assembly
22: negative terminal
30: cap plate
34: case
35: connection plate
38: sealing cap
39: vent member
41, 81: first safety member
42, 82: second safety member
411, 421: side plate
412, 422: inclined portion
413, 423: extension portion
414, 424: support portion
415, 425: connection portion
43, 44, 45, 46: insulation film
47: fixing member
49: conductive material
51, 52, 62, 72: current collecting member
811, 821: side plate
812, 813, 822, 823: connection protrusion

What is claimed is:

1. A rechargeable battery comprising:
   a plurality of electrode assemblies comprising a first electrode assembly and a second electrode assembly, and stacked along a first direction, each of the electrode assemblies comprising a coated region and an uncoated region, the coated region and the uncoated region being spaced from each other along a second direction crossing the first direction;
   a case housing the plurality of electrode assemblies;
   a first conductive plate having a substantial portion between the coated region of the first electrode assembly and the case in the first direction; and
   a first contact electrically coupling the first conductive plate to the second electrode assembly,
   wherein the substantial portion of the first conductive plate extends along a substantially entire length of the coated region of the first electrode assembly in the second direction.

2. The rechargeable battery of claim 1, wherein the second electrode assembly is farther from the first conductive plate than the first electrode assembly.

3. The rechargeable battery of claim 1, wherein the first conductive plate is not electrically coupled to the first electrode assembly.

4. The rechargeable battery of claim 1, further comprising a second conductive plate between the second electrode assembly and the case; and
   a second contact electrically coupling the second conductive plate to the first electrode assembly.

5. The rechargeable battery of claim 4, wherein the first electrode assembly is farther from the second conductive plate than the second electrode assembly.

6. The rechargeable battery of claim 4, wherein the second conductive plate is not electrically coupled to the second electrode assembly.

7. The rechargeable battery of claim 4, further comprising a cap plate covering an opening of the case, wherein the second contact is electrically coupled to the second conductive plate at a location near the cap plate.

8. The rechargeable battery of claim 1, wherein the first contact is electrically coupled to a negative electrode of the second electrode assembly.

9. The rechargeable battery of claim 8, further comprising a current collecting tab coupled to the negative electrode, wherein the negative electrode electrically couples the first contact to the current collecting tab.

10. The rechargeable battery of claim 9, further comprising a fixing member penetrating the first contact, the negative electrode, and the current collecting tab.

11. The rechargeable battery of claim 10, wherein the fixing member comprises a rivet.

12. The rechargeable battery of claim 8, further comprising a current collecting tab electrically coupling the first contact to the negative electrode.

13. The rechargeable battery of claim 12, wherein the first contact and the current collecting tab are welded together.

14. The rechargeable battery of claim 1, wherein the first conductive plate and the first contact each comprise metal.

15. The rechargeable battery of claim 1, wherein the first conductive plate and the first contact are integrally formed.

16. The rechargeable battery of claim 15, further comprising a cap plate on an opening of the case, wherein the first contact is coupled to the first conductive plate at a location spaced from the cap plate.

17. The rechargeable battery of claim 1, wherein the plurality of electrode assemblies further comprises a third electrode assembly adjacent the second electrode assembly and electrically coupled to the first conductive plate.

18. The rechargeable battery of claim 1, wherein the plurality of electrode assemblies further comprises at least a third electrode assembly and a fourth electrode assembly, wherein the third electrode assembly is between the second electrode assembly and the fourth electrode assembly, and wherein the third electrode assembly is electrically coupled to the first conductive plate and the fourth electrode assembly is electrically coupled to a second conductive plate.

19. The rechargeable battery of claim 1, wherein the substantial portion of the first conductive plate has a substantially planar shape and extends along a substantially entire height of the coated region of the first electrode assembly in a third direction crossing the first direction and the second direction.

20. A rechargeable battery comprising:
   a plurality of electrode assemblies comprising a first electrode assembly and a second electrode assembly;
   a case housing the plurality of electrode assemblies;
   a first conductive plate between the first electrode assembly and the case;

a first contact electrically coupling the first conductive plate to the second electrode assembly; and
  an insulation film between the first conductive plate and the first electrode assembly.

21. The rechargeable battery of claim 20, wherein the insulation film comprises a polymer material.

22. A rechargeable battery comprising:
  a plurality of electrode assemblies comprising a first electrode assembly and a second electrode assembly;
  a case housing the plurality of electrode assemblies;
  a first conductive plate between the first electrode assembly and the case;
  a first contact electrically coupling the first conductive plate to the second electrode assembly; and
  an insulation layer coupled to a portion of the first contact.

* * * * *